A. L. McGREGOR.
AUTOMOBILE BUMPER.
APPLICATION FILED MAR. 24, 1920.
1,358,964.
Patented Nov. 16, 1920.
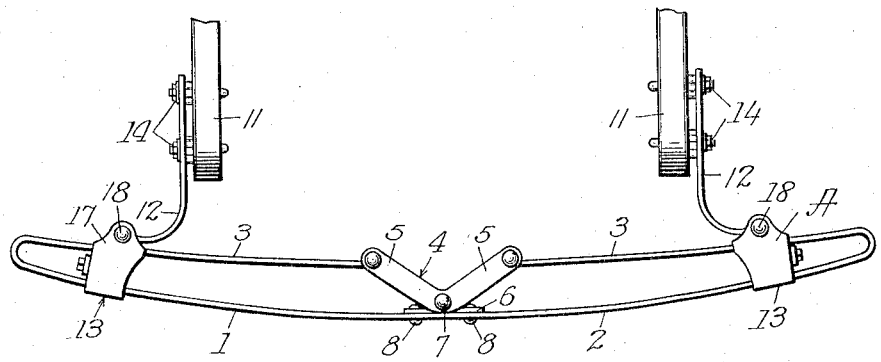
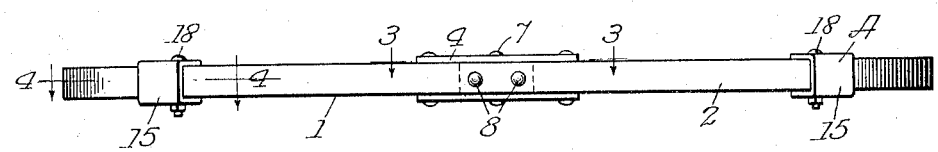
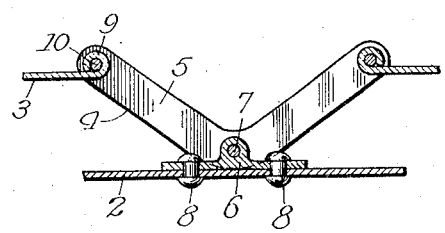
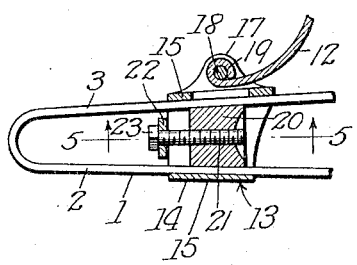
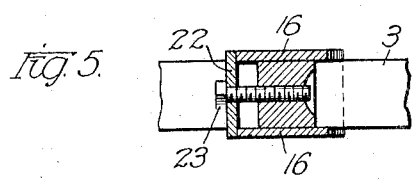
Inventor
Allan L. McGregor

UNITED STATES PATENT OFFICE.

ALLAN L. McGREGOR, OF CHICAGO, ILLINOIS.

AUTOMOBILE-BUMPER.

1,358,964.  Specification of Letters Patent.  Patented Nov. 16, 1920.

Application filed March 24, 1920. Serial No. 368,460.

*To all whom it may concern:*

Be it known that I, ALLAN L. McGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers, and more particularly to devices of the character described which are adapted for attachment to the front end of motor vehicles for the purpose of protecting the vehicle from collision with other vehicles or objects with which the vehicle may accidentally collide.

The object of this invention is to provide improved construction for bumpers employing an impact bar constructed of resilient bar material and embodying those features which will afford a greater degree of strength thereby enabling the bumper to resist the effects of impact without permanent distortion of the parts of the bumper. A further object of the invention is to provide a construction which will effect the distribution or equalization of the shock of impact throughout the entire bumper, thereby lessening the shock received at the point of impact.

The structure embodying the novel features of my invention is hereinafter more fully described and illustrated in the accompanying drawings, in which—

Figure 1 is a top plan view of the bumper attached to the vehicle frame members.

Fig. 2 is a front view in elevation of the bumper.

Fig. 3 is an enlarged detail view in horizontal section of the equalizing member, taken on line 3, 3 of Fig. 2.

Fig. 4 is an enlarged view in horizontal section, taken on line 4, 4 of Fig. 2, showing the means employed for connecting the bar to the frame members, and Fig. 5 is a detailed view in vertical section taken on line 5, 5 of Fig. 4.

A preferable form of a bumper embodying the features of my invention comprises in general an impact member formed of bar material having resilient qualities and so formed as to be yieldable in a horizontal direction, and relatively non-yieldable in a vertical direction. The impact member or bar 1 comprises a front impact bar 2 slightly curved throughout its length and having end portions 3, 3 bent into U-form so that said end portions extend substantially parallel to the front portion 2 and spaced a short distance therefrom. These end portions 3, 3, terminate short of the mid-point of the forward impact member 2, their free ends being joined together and likewise joined to the front impact member 2 by means of a bell crank lever 4. This bell crank lever or equalizing member, as it may be called, comprises two lever arms 5, 5 of equal length and arranged at an angle of slightly greater than 90 degrees to each other. At the junction of these arms the lever 4 is pivotally connected to a bracket 6 by means of a pivot bolt 7. The bracket 6, as clearly shown in Fig. 3, is riveted or otherwise permanently secured to the front impact member 2 by means of rivets 8, 8. The free ends of the portions 3, 3, of the bumper bar are rolled or turned to provide eyes 9, 9 which engage bolts 10, 10 serving to pivotally connect the ends of the said portions 3, 3, with the adjacent ends of the lever arms 5, 5 of the bell crank lever 4.

The bumper bar structure thus described is adapted to be attached to the forward ends of the vehicle frame members 11, 11 by means of connecting bars 12, 12 and intermediate clamping sleeves 13, 13. The connecting bars 12, 12 extend generally parallel to the frame members 11, 11 and are secured thereto at their rear ends by means of suitable clamping bolts 14, 14. The outer ends of the connecting bars 12, 12 are curved or bent outwardly in opposite directions through an angle of substantially 90 degrees so that their outer end portions extend substantially parallel to the end portions 3, 3, which in reality form the secondary or reinforcing bar of the bumper.

The outer ends of the connecting bars 12, 12 have pivotal connection with the clamping members 13, 13, the latter in turn being connected to the bumper bar 1 adjacent to the extremities thereof.

The construction of the clamping members 13 and the manner of joining the same to the connecting bars 12, 12 will be understood from the following: Each of the clamping members 13 comprises an angular sleeve or boxlike member 14 open at its ends, designed to be slipped on over the extremity of the bumper bar and to surround the parallel portions 2 and 3 thereof. As shown in Fig. 1, and more clearly in Fig. 4, the bumper bar is so formed that the portions 2 and 3 thereof diverge slightly from the extremities of the bar inwardly toward the center. For this reason it is preferred to provide the sleeve with opposing walls 15, 15 which contact flatwise against the outer vertical faces of the bars 2 and 3 with a corresponding degree of divergence, thus insuring a flatwise contact between the surfaces of the sleeve and the bumper bar. The walls 15, 15 of the sleeve 14 just described are joined together by upper and lower transverse walls 16, 16 thereby completing the box-like structure. Extending from one side of the sleeve 14, namely, from the side adjacent to the connecting bar 12, are provided ears 17, 17 which are continuations or extensions of the top and bottom walls 16, 16. At the centers of these ears are provided bolt holes through which a bolt 18 extends, said bolt also engaging an eye 19 formed at the extremity of the connecting bar 12. By means of this connection the sleeve is pivoted to the end of the connecting bar 12 and is free to swing about the point of connection. Included between the diverging walls 15, 15 of the sleeve 14 and adapted to have bearing engagement against the inner vertical faces of the portions 2 and 3 of the bar 1, is a sliding block 20, said block having a slight wedge-shaped contour in order to provide the same degree of divergence as the parallel walls 15, 15 of the sleeve 14. Extending through the central part of the block 20 and longitudinally of the sleeve is a bolt 21, said bolt also being loosely retained in an anchor plate 22 extending crosswise of the sleeve and bearing against the outermost edges of the upper and lower walls 16, 16. The bolt is provided with a head 23 which bears against the anchor plate 22.

In connecting the bumper bar to the vehicle the connecting bars 12, 12 would be attached to the vehicle frame members 11, 11, and then having slipped the sleeve members 14 over the ends of the bumper bar 1, with the wedge block removed, the said sleeves 14 would be attached to the ends of the connecting bars 12. Having thus determined the proper position for the clamping members 13, 13, the wedge block 20 together with its bolt 21 and anchor plate 22 are inserted within each sleeve 14 with the diverging faces thereof in contact with the portions 2 and 3 of the bumper bar. By turning the bolt 21 by means of a wrench engaging the head 23 thereof, the block is drawn toward the anchor plate thereby spreading the portions 2 and 3 of the bar 1, forcing them tightly into frictional engagement with the contacting walls of the sleeve 14. In this manner the clamping members 13 are securely, although adjustably, connected to the impact bar, and the clamping members in turn pivotally connected to the ends of the connecting bars 12, 12.

A bumper bar structure of the character described has the advantage of being of a double bar construction consisting of the forward impact member 2 and the rear or secondary reinforcing portions 3, 3. By providing a centrally located bell crank lever carried by the front impact member 2 and connected at its ends to the rear portions 3, 3, an equalizing effect is produced whereby the impact received at any point along the front impact member 2 is distributed uniformly throughout the entire structure. This not only increases the resiliency of the structure but also prevents any portion of the bar being permanently distorted by reason of the ability of the bar to absorb the shock of impact throughout all parts. An increased degree of resiliency is also afforded by the pivotal connection between the clamping members and the comparatively non-yieldable connecting bars 12, 12, although these members, by reason of their curved outer extremities, give a slightly greater degree of resiliency to the entire structure.

The structure herein described and illustrated is more specifically set forth in the appended claims.

I claim as my invention:

1. In an automobile bumper, the combination of an impact bar comprising two substantially parallel front and rear portions, one of said portions being divided intermediate its ends, and a lever mounted on the other portion of the bar and connected at its ends to the free ends of said first mentioned portion.

2. In an automobile bumper, the combination of an impact bar comprising two substantially parallel front and rear portions, said rear portion having a section removed intermediate its ends, and a bellcrank lever pivotally mounted on said front portion and connected at its ends to the free ends of said rear portion.

3. In an automobile bumper, the combination of a bar bent to form a continuous impact member and two spaced end portions terminating at their free ends centrally of the bar, and a lever pivotally mounted on said continuous impact member and having pivotal connection at its ends with the free ends of said end portions.

4. In an automobile bumper, the combination of an impact bar having its end portions bent double with their free ends terminating centrally of the bar, and a bell crank lever mounted at the central portion of the bar and connected at its ends with said free ends of said end portion.

5. In an automobile bumper, the combination of a resilient bar bent double to form a continuous front portion and a rear portion having its ends terminating in laterally spaced relation centrally of said front portion, and a bell crank lever mounted on said front portion and pivotally connected at its ends to said ends of the bar.

In witness whereof I hereunto subscribe my name this 20th day of March, A. D. 1920.

ALLAN L. McGREGOR.